M. KIUTSI.
FERMENT FILTER.
APPLICATION FILED NOV. 10, 1915. RENEWED FEB. 4, 1922.
1,412,818. Patented Apr. 11, 1922.
Fig I
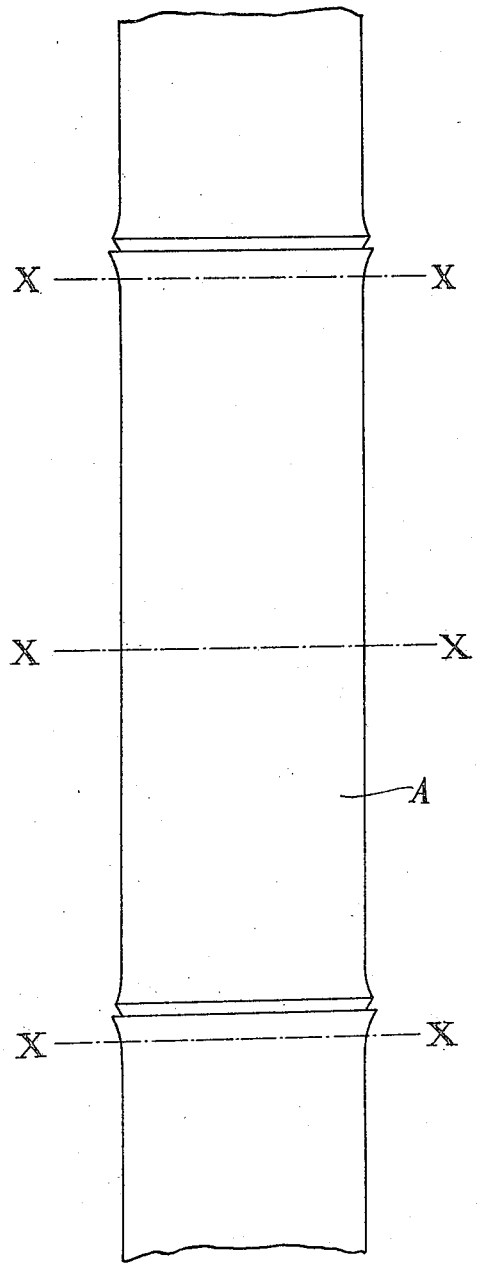
Fig II
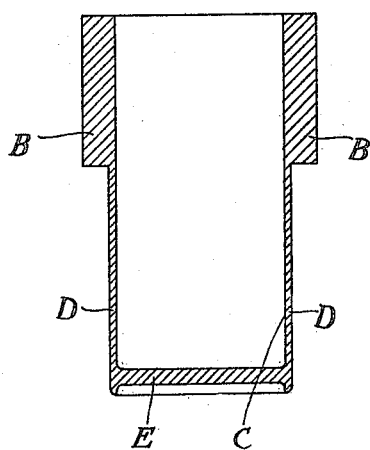
Fig III
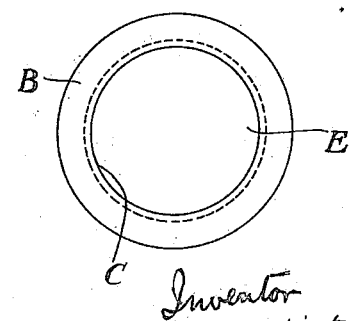

UNITED STATES PATENT OFFICE.

MIKI KIUTSI, OF HAKODATE, JAPAN.

FERMENT FILTER.

1,412,818.            Specification of Letters Patent.     Patented Apr. 11, 1922.

Application filed November 10, 1915, Serial No. 60,732. Renewed February 4, 1922. Serial No. 534,283.

*To all whom it may concern:*

Be it known that I, MIKI KIUTSI, a subject of the Emperor of Japan, residing at No. 40 Funamicho, in the city of Hakodate, Hokkaido, Japan, have invented certain new and useful Improvements in Ferment Filters, of which the following is a specification.

This invention relates to filters, and particularly consists of ferment filters having a special property of allowing the passage of ferments only out of certain liquid comprising miscellaneous constituents. The ferment filter of this invention is formed in a tubular shape having a bottom at its one end, the other end being open, and characterized, in view of materials used, by the adoption of the thin membrane and the node, in culm of any plant belonging to the Graminaceæ, for instance bamboo, reed and others in the same genus thereof, where the bamboo is most suitable above others.

This invention has for its objects to apply such filters for the study of fermentology and biochemistry, as well as for medical diagnostic purposes, the pure extraction of ferment being easily carried out by the use of the new filters of this invention alone.

It will be pointed out as an advantageous feature of this invention, that such pure extraction of ferment, which was not intended and impossible heretofore, is easily carried out, and accordingly the study of products resulting from the decomposition by the action of pure ferment will be made very much easier than heretofore. In the case of human diseases and that of other animals, detection of any special ferment of several kinds, which may appear in their serum and urine, etc., becomes very easy. Thus the diagnosis of diseases is positively ascertained.

In the accompanying drawings, Fig. I diagramatically illustrates a part of the stem of ordinary bamboo to be used for the making of the ferment filter of this invention, and Fig. II shows an example of a ferment filter made of such bamboo, in a longitudinal vertical section, and Fig. III is a plan view of the same.

As already described, the peculiar property of the inner membrane in culm of Graminaceæ embodies the essential feature of this invention, and the culm may be herbaceous or woody if it has such membrane inside of it. The ferment filter made of bamboo stem according to this invention will be first described referring to the accompanying drawings. As shown in Fig. I, a suitable stem A of bamboo of desired size is taken and so cut off by means of saw or the like at points X—X between two adjacent modes and near either one of them, as to form a bamboo tube, as shown in Fig. II, closed at one end with a node E and the other end naturally open. Then as shown in the Fig. II, the outside layer B of the bamboo tube is split off from about middle part to the bottom end, taking care not to damage the inner membrane C as it naturally covers the inside surface i. e. the middle layer D of the tube. Thus the wall in the bottom half of the bamboo tube will be much less than halved in its thickness, but if desired the outside layer may be taken off throughout the whole length of the tube.

The bamboo tube, formed as above described, is then boiled in distilled water in a suitable kettle or pot, repeating several times such boiling in fresh water.

The ferment filter, according to this invention, may be also made from the culm of reed, in just the same way as shown and above described for bamboo.

Further the culm of any other plant than bamboo and reed, but equally belonging to Graminaceæ, and having an inner thin membrane, is available for the making of the ferment filter, and the filter may be worked out in just the same way as above described for bamboo and reed.

According to this invention, the thin membrane in the culm may be split off without any damage, and the ferment filter may be formed in a shape of a sack like a fingersack, which should be reinforced with an ordinary filter paper.

Nodes in culms are generally covered with a similar thin membrane, as the other part of the culm, which is however too firmly united with the nodes to be split off and to be separated from the nodes. Such node therefore may also be used in making the ferment filter according to this invention. The node of ordinary bamboo is most suitable for this purpose, but nodes of any other plant may be also equally available.

In this case, the node is so fixed, by any suitable means and manner, at one end of a hollow cylinder of either metal, porcelain or glass, as to close that end and to constitute a water-tight bottom plate of the cylinder, thus the ferment filter is formed.

The use of the ferment filter of this invention may be shortly sketched as follows. The ferment filter of this invention has a special distinguished power of extracting ferment only, containing no impurity, out of certain liquid of miscellaneous constituents, for instance blood, urine, milk, saliva, sweat, etc., it will be remarked from the medical point of view.

A process of extracting the pure ferment according to this invention will be described in the way of an example. When the pure extraction of any ferment, out of a certain liquid of miscellaneous constituents, is required, the liquid is first taken in to a ferment filter, which is then immersed in a suitable vessel filled with distilled water. In this way, the miscellaneous constituents, except ferment, will remain in the filter, but only the ferment goes out into the distilled water in the vessel, passing through the thin membrane of the filter. If it is left to stand still for about twenty four hours, nearly the whole of the existing ferment will go out into the water around the filter in the vessel. The water in the vessel now containing ferment is conveniently transferred into a suitable glass vessel and evaporated by means of water bath or the like at a temperature lower than 90° C. Thus the dried ferment remains in the glass vessel, from which the ferment may be collected.

Having now particularly described and ascertained the nature of my said invention and in what manner the same is to be performed, I declare that what I claim is:—

1. A ferment filter having the special property of extracting pure ferment out of certain liquid of miscellaneous constituents, comprising a stem of bamboo boiled in water and so cut as to form a tubular shape, one node forming the bottom, the outside layer of the tube being removed so that the thin membrane remains, the latter constituting a filtering element.

2. The method of making ferment filters which consists in separating the inner thin membrane of the culm of a plant belonging to Graminaceæ, from the outside layer of said culm, and boiling the said inner membrane.

3. The method of making filters which consists of repeatedly boiling in distilled water the inner membrane removed from the culm of any plant belonging to the Graminaceæ.

4. A ferment filter comprising a stem of bamboo comprising a node and a tubular portion, the stem being cut transversely through the node whereby to form a bottom for the tubular portion, and said stem having the outside layer thereof cut away so as to leave the inner membrane of said stem, said inner membrane constituting a filtering element.

In testimony whereof I affix my signature in presence of two witnesses.

MIKI KIUTSI.

Witnesses:
  E. J. HEUN,
  A. KING.